(12) United States Patent
Ong

(10) Patent No.: US 7,581,099 B2
(45) Date of Patent: Aug. 25, 2009

(54) SECURE OBJECT FOR CONVENIENT IDENTIFICATION

(75) Inventor: Peng T. Ong, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/708,795

(22) Filed: Feb. 20, 2007

(65) Prior Publication Data

US 2007/0208950 A1    Sep. 6, 2007

Related U.S. Application Data

(62) Division of application No. 10/420,676, filed on Apr. 21, 2003, now abandoned.

(30) Foreign Application Priority Data

Mar. 3, 2003  (SG) .............................. 200301114-5

(51) Int. Cl.
*H04L 9/00* (2006.01)
(52) U.S. Cl. ....................... 713/170; 713/189
(58) Field of Classification Search ................. 713/189; 726/28, 29
See application file for complete search history.

(56) References Cited

U.S. PATENT DOCUMENTS

| | | | |
|---|---|---|---|
| 5,943,423 A | 8/1999 | Muftic | |
| 6,460,138 B1 | 10/2002 | Morris | |
| 6,704,871 B1 | 3/2004 | Kaplan et al. | |
| 7,039,027 B2 | 5/2006 | Bridgelall | |
| 7,069,433 B1 | 6/2006 | Henry et al. | |
| 7,289,971 B1 * | 10/2007 | O'Neil et al. | 705/44 |
| 7,356,705 B2 * | 4/2008 | Ting | 713/186 |
| 2001/0001876 A1 | 5/2001 | Morgan et al. | |

(Continued)

FOREIGN PATENT DOCUMENTS

GB    2370474 A1    6/2002

(Continued)

OTHER PUBLICATIONS

Chan, Siu-cheng Charles, "*An Overview of Smart Card Security*", http://home.hkstar.com/~alanchan/papers/smartCardSecurity/, 1997, 19 pages.

*Primary Examiner*—Nasser G Moazzami
*Assistant Examiner*—Carlton V Johnson
(74) *Attorney, Agent, or Firm*—Stephen J. Walder, Jr.; Jeffrey S. LaBaw

(57) ABSTRACT

A method for controlling access to a process to be executed on a data processing system is provided. An interface is provided for coupling a security device to the data processing system. The security device is a separate hardware device from the data processing system. User input of an identifier for accessing the security device is received, the identifier is verified, and the security device is accessed, in response to the identifier being verified, to obtain authentication data for the process to be executed on the data processing system. The authentication data is injected into a login process associated with the process to be executed to automatically authenticate a user to the process to be executed. The security device uses private-public key authentication to authenticate the user to the process to be executed without the user being aware that private-public key authentication is being performed.

17 Claims, 4 Drawing Sheets

U.S. PATENT DOCUMENTS

| | | |
|---|---|---|
| 2002/0018569 A1 | 2/2002 | Panjwani et al. |
| 2002/0169961 A1 | 11/2002 | Giles et al. |
| 2003/0014372 A1 | 1/2003 | Wheeler et al. |
| 2003/0182230 A1 * | 9/2003 | Pessin ......................... 705/39 |

FOREIGN PATENT DOCUMENTS

| | | |
|---|---|---|
| WO | WO 00/42491 | 7/2000 |
| WO | WO 02/052784 A1 | 7/2002 |
| WO | WO 02/086718 A1 | 10/2002 |

* cited by examiner under 35 U.S.C. 365(b) of corresponding Singapore Patent Application Ser. No. 200301114-5, filed Mar. 3, 2003.

SECURE OBJECT FOR CONVENIENT IDENTIFICATION

CROSS REFERENCE TO RELATED APPLICATIONS

This application is a divisional of U.S. application Ser. No. 10/420,676, filed Apr. 21, 2003 now abandoned and claims the foreign priority benefit under 35 U.S.C. 365(b) of corresponding Singapore Patent Application Ser. No. 200301114-5, filed Mar. 3, 2003.

FIELD OF THE INVENTION

The present invention pertains to the field of secure networks and computing devices. More particularly, the present invention relates to a device for automatic user authentication.

BACKGROUND OF THE INVENTION

With rapid growth of Internet and networks, the popularity of Internet technology rises among users of network services. In order to provide secure access to network services, user names and passwords are utilized to authenticate the user logging into a system providing particular network services. Users may accesses several applications, each with its own separate authentication mechanism causing the user to remember multiple user names and passwords. Due to this inconvenience users usually utilize the same user name and password for multiple applications that they access. In addition, users choose easy to remember passwords, which usually are easy to crack by hackers. Cracking of one password for an account breaches other accounts with the same user name and password. Network setups such as wireless Local Area Networks, remote access features, and weak intrusion protection increase vulnerability of passwords to technical attacks by hackers.

Many hackers are able to trick users by posing as system administrators causing the users to voluntarily provide the hackers with their passwords and user names.

Due to multiple accounts and multiple passwords that users maintain, password management for system administrators becomes a tedious and sometimes burdensome task. Resetting forgotten and compromised passwords, disabling all accounts of a departing employee are examples of tasks that system administrators need to perform in order to manage passwords of existing accounts in the system. Inaccurate password management may lead to security breaches, such as failing to delete a password of a fired employee may allow that employee to access network areas that that employee should not be accessing anymore.

Further, even if passwords are correctly managed, using passwords correctly for authenticating users is fundamentally vulnerable to various attacks from anywhere on the Internet. One of the best ways to lower the population of potential attackers is to use a certificate-based authentication mechanism with private keys stored on physical tokens. The process of transitioning from password-based authentication to token/certificate-based authentication is a complex process. However, it is a transition process that all enterprises serious about digital security need to undertake.

What is needed, therefore, is a solution that overcomes these and other shortcomings of the prior art.

SUMMARY OF THE INVENTION

In one illustrative embodiment, a method for controlling access to a process to be executed on a data processing system is provided. The method comprises providing an interface for coupling a security device to the data processing system. The security device is a separate hardware device from the data processing system. The method further comprises receiving user input of an identifier for accessing the security device, verifying the identifier, and accessing the security device, in response to the identifier being verified, to obtain authentication data for the process to be executed on the data processing system. The method further comprises injecting the authentication data into a login process associated with the process to be executed to automatically authenticate a user to the process to be executed. The security device uses private-public key authentication to authenticate the user to the process to be executed without the user being aware that private-public key authentication is being performed.

In another illustrative embodiment the method further comprises automatically capturing user authentication data input by a user into the data processing system, automatically converting the user authentication data into a stronger form of user authentication data to be presented to a process for accessing the process, and automatically storing the stronger form of user authentication data in the security device. The automatic capturing, converting and storing operations are performed by an access agent executing on the data processing system. The access agent is configured to periodically change the user authentication data for accessing a process automatically without the user being aware of the change.

These and other features and advantages will be described in, or will become apparent to those of ordinary skill in the art in view of, the following detailed description of the illustrative embodiments.

BRIEF DESCRIPTION OF THE DRAWINGS

The present invention is illustrated by way of example and not limitation in the figures of the accompanying drawings, in which like references indicate similar elements.

DETAILED DESCRIPTION

Figure 1:
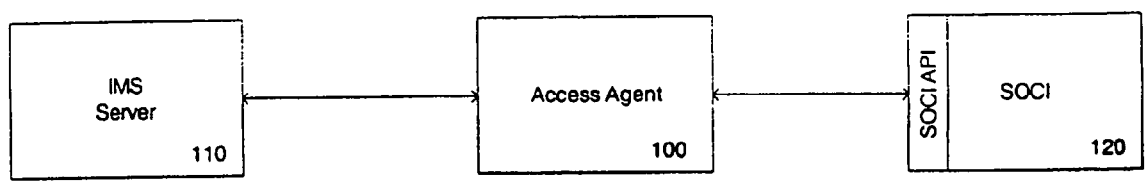
FIG. 1 illustrates an exemplary system architecture according to one embodiment of the invention.

A method and apparatus for user authentication is described. Note that in this description, references to "one embodiment" or "an embodiment" mean that the feature being referred to is included in at least one embodiment of the present invention. Further, separate references to "one embodiment" in this description do not necessarily refer to the same embodiment; however, neither are such embodiments mutually exclusive, unless so stated and except as will be readily apparent to those skilled in the art. Thus, the present invention can include any variety of combinations and/or integrations of the embodiments described herein.

The present invention discloses a method and system for authenticating user via physicalization of user credentials at a hardware device. Passwords and usernames of a user are stored in a hardware device and automatically provided to corresponding applications that the user is attempting to access.

It will be appreciated that the term "playback", as used herein, means automatically inserting stored user authentication information into appropriate applications. The term "client machine", as used herein, means a processing system hosting a Secure Object for Convenient Identification.[LBKI]

Related Technology

Introduction to related technology may be helpful in understanding some embodiments of the invention.

One embodiment of the invention utilizes Simple Object Access Protocol (SOAP). SOAP is a message-based protocol based on Extensible Markup Language (XML) for accessing services on the Web. SOAP employs XML syntax to send text commands using HTTP.

One embodiment of the invention utilizes HyperText Transfer Protocol Secure (HTTPS). HTTPS is a protocol for accessing secure Web servers. Using HTTPS in a Uniform Resource Locator (URL) instead of HTTP directs the message to a secure port number rather than to a default port number.

One embodiment of the invention utilizes Smart Card technology. The smart card is an intelligent token that provides computational capability and memory capability. The self-containment of the smart card makes it resistant to attack as it does not depend on potentially vulnerable external resources. The physical structure of a smart card is specified by the International Standards Organization (ISO) 7810, 7816/1 and 7816/2. The capability of a smart card is defined by its integrated circuit chip. Typically, the integrated circuit chip consists of a microprocessor, read only memory (ROM), non-static random access memory (RAM) and electrically erasable programmable read only memory (EEPROM), which will retain its state when the power is removed.

Another embodiment of the invention utilizes public-key algorithms. Public-key algorithms use two different keys: a public key and a private key. The private key member of the pair must be kept private and secure. The public key, however, can be distributed to anyone who requests it. The public key of a key pair is often distributed by means of a digital certificate. The digital certificate is a digitally signed statement that contains information about the entity and the entity's public key, thus binding these two pieces of information together. A certificate is issued by a trusted organization called a Certification Authority (CA) after verification of the entity's identity. When one key of a key pair is used to encrypt a message, the other key from that pair is required to decrypt the message. Thus, if the user's public key is used to encrypt data, only a person who has the user's private key can decrypt the data. If the user's private key is used to encrypt data, then only user's public key will decrypt the data. In addition, if the private key is used to sign a message, the public key from that pair must be used to validate the signature.

Exemplary Architecture

FIG. 1 illustrates an exemplary architecture of the invention. An Access Agent 100 interfaces with Secure Object for Convenient Identification (SOCI) device 120 via SOCI Application Program Interface functions. In addition, the Access Agent 100 communicates with Identity Management System (IMS) 110 via SOAP or HTTPS. IMS is located on a server machine and communicates with a client machine that hosts the SOCI.

Figure 2:
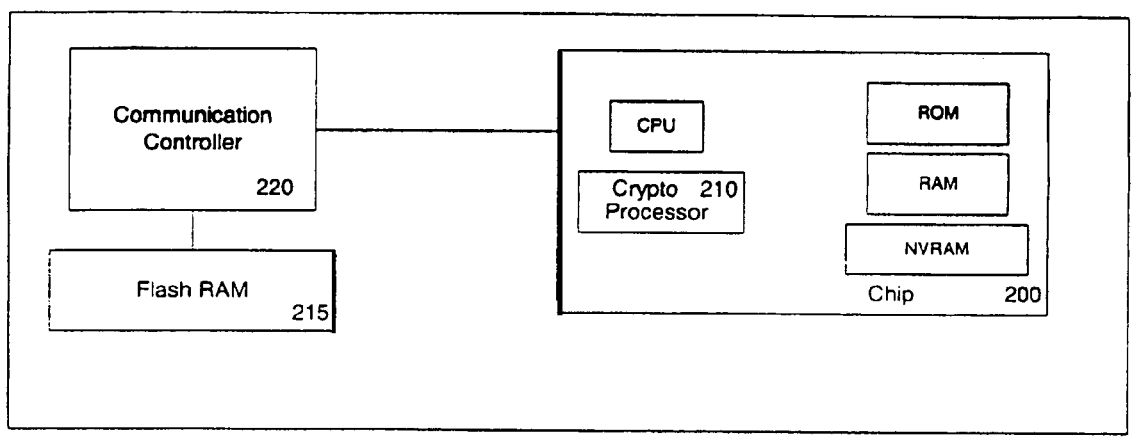
FIG. 2 illustrates components of a Secure Object for Convenient Identification according to one embodiment of the invention.

FIG. 2 illustrates an exemplary architecture of the SOCI according to an embodiment of the invention. The SOCI is a hardware token capable of being connected to the user's computer. The SOCI includes a chip CryptoVault 200, that may be a smart card chip. The chip 200 includes a crypto processor 210 that performs cryptographic calculation described below. Cryptographic calculations include symmetric key, asymmetric key and hash algorithms such as RSA, DES, 3DES, SHA1 and MD5, all of which are well known in the art and do not require any further explanation. In addition, the chip 200 includes NVRAM to store sensitive private data, such as private keys. The SOCI also includes Flash RAM 215 to store software drivers and non-sensitive data such as user configuration data, digital certificates, etc. The Flash RAM 215 in addition to SOCI drivers also contains software drivers to perform configuration operations such as installation of Access Agent on the client's computer. Part of the Flash RAM 215 memory is partitioned for a Smart Card File System (SCFS) interface. The RAM 215 may also contain a plug-n-play storage drive that appears as a disk drive on an operation system platforms supporting, for example, USB 1.1 mass-storage devices. A Communication controller 220 is another component of the SOCI. The Communication controller 220 may be a USB controller, a Bluetooth controller, an RFID controller, a PCMCIA controller, an 802.1 lb controller, or other controller known in the art. The Communication controller provides access from the client computer, i.e. SOCI host computer, to the Flash RAM storage 215 and the chip 200. The SOCI includes Application Interface Functions via which the client computer communicates with the SOCI. The Application Interface Functions provide high-level abstraction for SOCI services, such as certificate management, data encryption/decryption, and digital signature generation. The functions exposed by the Application Programming Interface may be implemented by a SOCI Runtime Library (not shown). SOCI may be wirelessly connected to the client commuter or may be connected via a serial bus. In addition, SOCI may communicate with servers via Local Area Networks (LANs).

In one embodiment, the SOCI stores its authentication information to be provided to the Access Agent in a certificate signed by Certificate Authority (CA) trusted by the Access Agent. The Certification Authority (CA) is an entity entrusted to issue certificates asserting that the recipient individual, machine or organization requesting the certificate fulfills the conditions of an established policy. Certificates together with private keys may be utilized in SOCI to authenticate the user.

The SOCI comprises a tamper-evident casing to prevent physical access to SOCI components. In addition, the SOCI may comprise a display and a keyboard allowing the users to control SOCI directly without utilizing the computer.

During manufacturing, information about particular SOCI device is recorded in the NVRAM of the device. Information includes a serial number of the device, a color of the device, a physical form of the device, identification of the manufacturer and the date of manufacturing, etc. These information is stored as digitally signed attributes in a certificate signed by the CA trusted by the Access Agent. When the Access Agent registers the device with a server, verification of ownership of the certificate is performed by ensuring that the signature on the device certificate is digitally signed by the CA trusted to issue device certificates.

Figure 4:
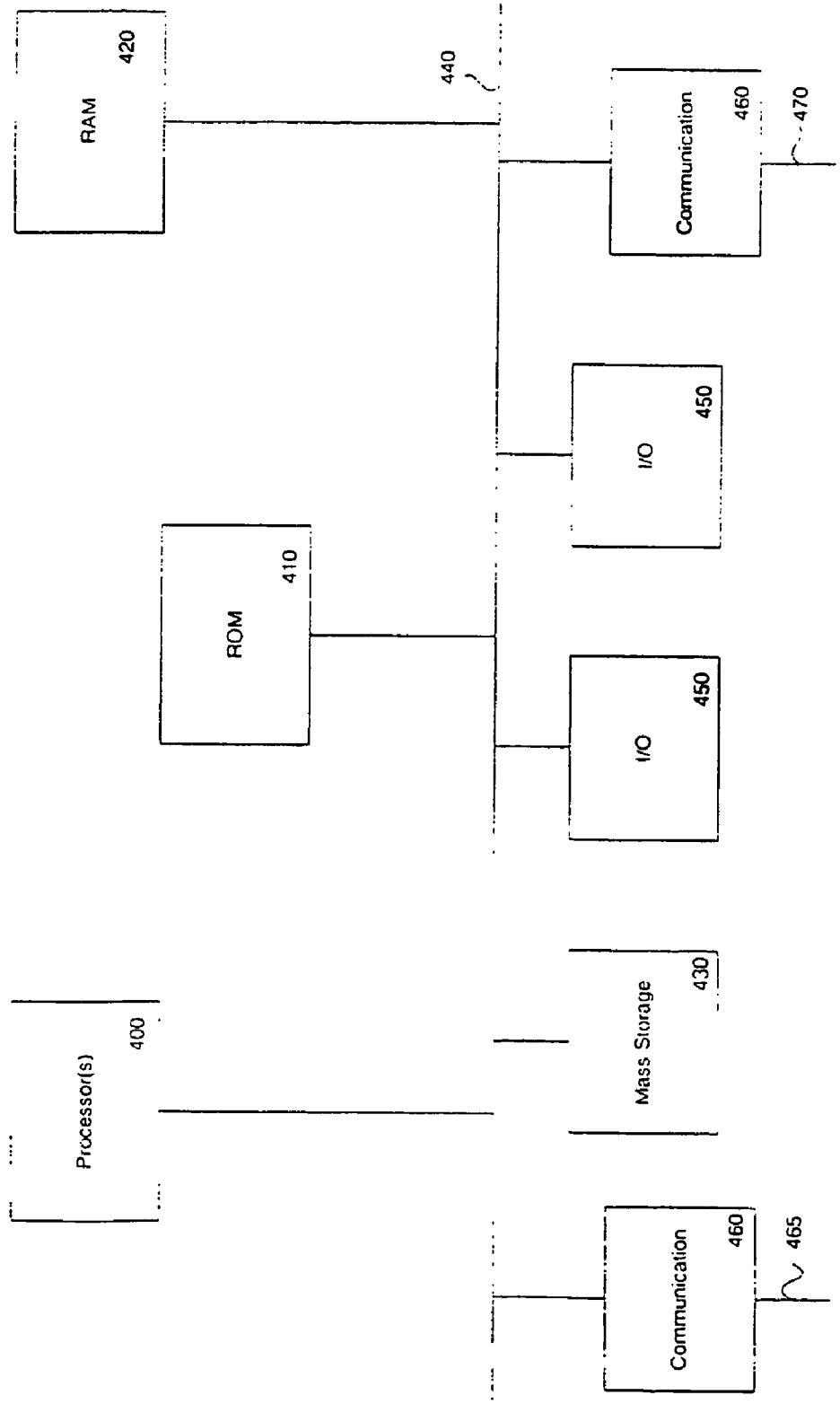
FIG. 4 is an exemplary architecture of a processing system according to one embodiment of the invention.

The physical processing platforms that embody the Access Agent and IMS may include processing systems, such as conventional personal computers (PCs) and/or server-class computer systems according to various embodiments of the invention. FIG. 4 illustrates an example of such a processing system at a high level. The processing system of FIG. 4 includes one or more processors 400, read-only memory (ROM) 410, random access memory (RAM) 420, and a mass storage device 430 coupled to each other on a bus system 440. The bus system 440 includes one or more buses, which may be connected to each other through various bridges, controllers and/or adapters, which are well known in the art. For example, the bus system 440 may include a 'system bus', which may be connected through an adapter to one or more expansion, such as a peripheral component interconnect (PCI) bus or an extended industry standard architecture (EISA) bus. Also coupled to the bus system 440 are a the mass storage device 430, one or more input/output (I/O) devices 450 and one or more data communication devices 460 to communicate with remote processing systems via one or more communication links 465 and 470, respectively. The I/O devices 450 may include, for example, any one or more of a display device, a keyboard, a pointing device (e.g., mouse, touchpad, trackball), an audio speaker.

The processor(s) 400 may include one or more conventional general-purpose or special-purpose programmable microprocessors, digital signal processors (DSPs), application specific integrated circuits (ASICs), or programmable logic devices (PLD), or a combination of such devices. The mass storage device 430 may include any one or more devices suitable for storing large volumes of data in a non-volatile manner, such as magnetic disk or tape, magneto-optical storage device, or any of various types of Digital Video Disk (DVD) or Compact Disk (CD) based storage or a combination of such devices.

The data communication device(s) 460 each may be any devices suitable for enabling the processing system to communicate data with a remote processing system over a data communication link, such as a wireless transceiver or a conventional telephone modem, a wireless modem, an Integrated Services Digital Network (ISDN) adapter, a Digital Subscriber Line (DSL) modem, a cable modem, a satellite transceiver, an Ethernet adapter, or the like.

Methodology

With theses concepts in mind embodiments of the invention can be further explored.

Startup Procedure

Figure 3:
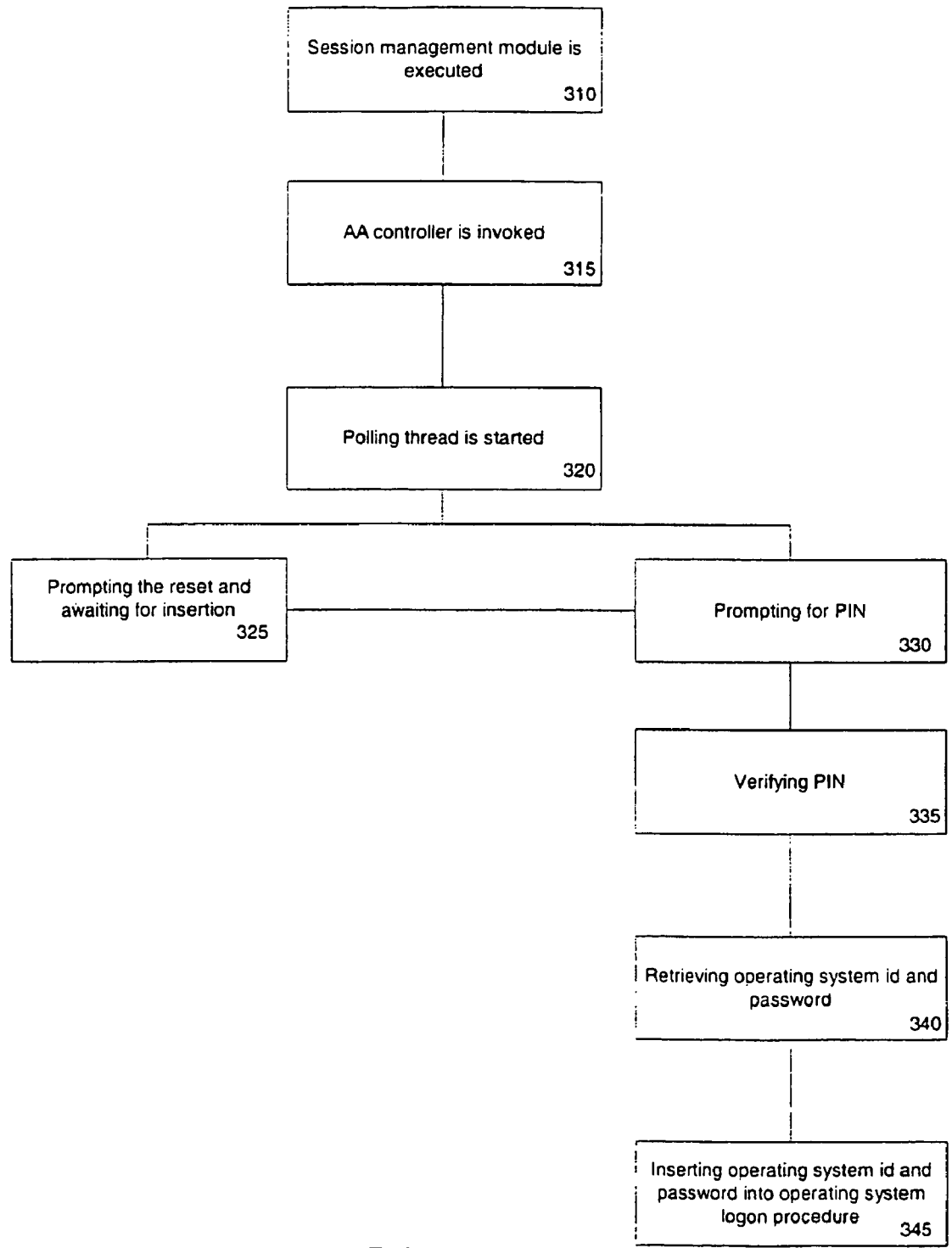
FIG. 3 is a flow chart of a startup procedure according to one embodiment of the invention.

In order for a user to be automatically authenticated for each application that the user attempts to access, the Access Agent 100 can be executing on the user's machine, i.e. client machine. The startup procedure will be described with reference to FIG. 3. At 310 the Access Agent 100 is executed upon the boot up of the client machine. The Access Agent 100 interacts with a logon procedure of the operating system to handle initialization procedures. Upon initialization, the Access Agent 100 at 320 starts a thread, which may poll ports, for example USB ports, of the client machine. The polling thread identifies whether SOCI is present in any of the ports. If the polling thread does not identify the SOCI, the Access Agent at 325 prompts the user to insert the SOCI and awaits for the insertion of the SOCI by periodically polling the ports. If the polling thread identifies that SOCI is already connected to the port or if the new SOCI has been inserted, the session management module 230 displays a dialogue box prompting the user for a personal identification number (PIN). Upon the user entering the PIN, the Access Agent at 335 verifies the entered PIN. If the PIN is successfully verified, the Access Agent 100 obtains the operating system login and password information of the user at 540. For example, if the client machine is running Windows Operating System, the Access Agent 100 obtains Windows Login ID and Windows Password. In one embodiment the operating system login identification and password data are encrypted and stored in the SOCI and retrieved by the Access Agent 100 via SOCI APIs. The user may have several operating system login identifications and passwords and in this case the user may be presented with a pull down menu to select the login ID and password for the current session. At 345 upon determining and decrypting the login ID and password, the Access Agent 100 inserts the ID and password into the operating system logon procedure.

SOCI Initialization

In one embodiment upon insertion of the SOCI, a setup program located in the flash memory of the SOCI is executed to determine whether the Access Agent 100 is installed on the client machine. If the Access Agent is not installed on the client machine, the setup program locates the download server to download the Access Agent installer module. The setup program may contain a default location of the installer module. If the setup program fails to locate the installer for download, the setup program prompts the user for location of the installer or for an insertion of a diskette or CD-ROM including the installer module. Upon installation of the installer, the user is prompted to enter a SOCI personal identification number (PIN) and password. PIN of the SOCI is distributed with the SOCI. User can change the PIN after obtaining access to the SOCI upon entering the original PIN. Upon the user entering the PIN and password, the installer transmits the PIN and password data to the IMS. In one embodiment data transmitted to the IMS includes SOCI identification number retrieved from the SOCI device, SOCI properties, SOCI public keys, encrypted Common Symmetric Key (CSK). Upon receiving the data, the IMS creates a new user account and registers the SOCI with the account. The IMS generates a new certificate and transmits the certificate to the Access Agent which stores the certificate in the SOCI. The IMS may also encrypt the CSK with a key derived from the SOCI password and further encrypt the CSK with the IMS's public key. In one embodiment, the server's public key is stored on a separate secure server, or stored in a hardware key device.

Automated Authentication

In one embodiment the Access Agent 100 executes in the background at the client machine and identifies user's login, logout, change of password activities and records the procedures in a form of an access script. The access scripts are encrypted and stored in the SOCI and the IMS server. The Access Agent 100 captures operating system messages for various applications and identifies whether any of the captured messages comprise user authentication data. If the Access Agent 100 identifies the user authentication application data for a particular application, the Access Agent 100 stores the information in the SOCI. Upon identifying the user authentication application, the Access Agent 100 generates access scripts to be played back when the user attempts to access an application requiring authentication information. When the user attempts to access the application, the Access Agent 100 determines whether an access script exists for the application. If the access script exists, the authentication information is injected into the login procedure of the application. If the access script does not exist, the Access Agent 100 captures the logon information entered by the user and stores the encrypted information in the SOCI and IMS. An access script is an XML-based script that contains information on how to playback authentication information, such as the location of the application in the computer, the name of the application, the buttons to click, etc. An example of an access script is provided below:

```
<AccessScript ASPoint="explorer.exe">
<ASMethod MethodName="explorer.exe-1" MethodType="login"><ASStep
ID="1"><ASResult>
<WebSignature><PageURL></PageURL>
<UserFieldName></UserFieldName>
<PwdFieldName>
</PwdFieldName>
<ActionFieldName></ActionFieldName></WebSignature>
<WndSignature><WndID/>
<WndTitle>Connect
to</WndTitle><ServerLabel></ServerLabel><UserNameLabel>User
name:</UserNameLabel><PasswordLabel>Password:</PasswordLabel><
NewPasswordLabel></NewPasswordLabel><VerifyPasswordLabel></Verif
yPasswordLabel><LeftStr>Connect
to</LeftStr><RightStr></RightStr><ServerDlgID/><UserNameDlgID/><New
PasswordDlgID/><OkButtonID/></WndSignature><ASEvent><Message><
/Message>
</ASEvent></ASResult></ASStep></ASMethod></AccessScript>
```

In addition, the access script contains information allowing the Access Agent 100 to recognize access points of an application, the class identification of the application, password policies associated with the application, etc.

In one embodiment upon identification of user's authentication data, the Access Agent 100 converts the user's authentication data into a stronger form of authentication data to be then presented to the applications that user attempts to access. The conversion of the authentication data may be performed without the user being aware of the change. The Access Agent 100 can generate a longer password by adding alpha-numeric characters into the password, for example to the end of the user's password. The Access Agent 100 can also generate a random password to be utilized for user authentication purposes instead of the user's chosen password to ensure higher security levels. The new password is generated based on configurable criteria, such as the minimal length, or the inclusion of special characters. In addition, the stronger form of authentication data can be digital certificates, private keys, etc. The request for change of passwords to the application can be performed by either Access Agent or IMS. This is done by supplying both the old password and the new password to the application. Once the application accepts the change and is aware of the new password, Access Agent will store the new password in the form of configuration data encrypted by the CSK. The Access Agent 100 may also request IMS for a digital certificate using a private key stored in the SOCI. This stronger form can be used for user authentication purposes instead of user's password if the application is configured to use public key authentication mechanism. Once again, the procedure of conversion of user's password into a stronger form of authentication credentials may be performed without knowledge of the user. By configuring the Access Agent to periodically and automatically perform the above procedures, user credentials will be more [LBK3]secured, hence they are fortified.

Data Synchronization

In one embodiment the user authentication data and access scripts are stored in SOCI and on the IMS server for a backup. The data in the SOCI and IMS server is identical, unless during one of the update sessions by Access Agent 100, the server was not accessible due for example, to lack of network connection between the client machine and the IMS server. Also, the data on the server may be updated when the user utilizes a duplicate SOCI, causing the original SOCI not to have the latest copy of the user authentication data. In one embodiment, all the records stored in the SOCI and IMS server are time stamped allowing the Access Agent 100 to determine whether SOCI or IMS server includes the latest data. Upon determining the location of the latest user authentication data, the Access Agent 100 directs SOCI or IMS to update the data to ensure identical copies of user authentication data on SOCI and IMS server.

In one embodiment, the user authentication data may be stored on the client machine as software. If a SOCI device is not available, the user may request the stored authentication data from the IMS server. Upon downloading the user authentication information to the client machine, the downloaded data may be used by the Access Agent in a manner described above.

Secure SOCI Authentication

In one embodiment of the invention SOCI will authenticate itself only to servers included in the trusted host list stored in SOCI. To prevent tampering with the list, the list is stored in SOCI rather than on the user's computer that is typically not secured. The trusted host list contains servers that user is attempting to access using public key algorithm authentication mechanism, such as IMS server. Restricting the servers to which SOCI can authenticate may prevent a form of "man-in-the-middle" attacks, which occurs when a client authenticates to a malicious server, allowing the malicious server to masquerade as the client to a legitimate server by forwarding the responses to any challenges given by the legitimate server. Thus, prior to performing any cryptographic calculations described in this specification, SOCI ensures that a server that is being accessed by the user is on the trusted host list.

SOCI PIN Distribution

Each SOCI is assigned a personal identification number (PIN) at the time of manufacturing. In order for the user to unlock SOCI for the first time, the user has to use the assigned PIN. However, the PIN can be changed by the user at a later time. In acase that the user utilizes multiple SOCIs, it is advantageous that all SOCIs are assigned the same PIN to simplify SOCI login procedure for the user. In one embodiment of the invention, the Access Agent 100 detects a change in SOCI PIN performed by the client. The Access Agent 100 encrypts the new PIN with the public keys of all SOCIs of the user and distributes the encrypted PIN to the SOCIs utilizing IMS server. SOCI devices decrypt the PIN with the private key and update their data to reflect the new PIN.

It will be appreciated that the same method may be employed to ensure that all SOCI's utilized by the user are updated upon the user changing user authentication information for different applications.

Public/Private Key Authentication

As described above, in one embodiment of the invention, SOCIs include public-private key pairs to be registered with a Certificate Authority of IMS. The issued certificate and key pair are stored in the SOCI. When the Access Agent detects an application that has been configured to employ public keys for user authentication, the Access Agent directs the SOCI to perform crypto function to automatically cause the application to provide the user with the access. The private key is stored in the SOCI and is not provided to any application or any user. The SOCI has physical tamper-proof features to ensure that private keys are not released. In one embodiment the private key may be burned into the chip of SOCIs during manufacturing.

In one embodiment administrators of IMS may cause the authentication system to utilize private-public key method without the system users being aware of the change. Due to automatic user authentication, the users need not be aware of the authentication method employed as long as they are provided with the desired application access.

Cloning of SOCI[LBK9]

In one embodiment, a SOCI device can be "cloned", such that the second SOCI can functionally authenticate to the same set of applications as the original SOCI. A SOCI includes a symmetric key, which is used to encrypt the contents of SOCI. To "clone" a SOCI in a secure manner, the original SOCI encrypts its symmetric key using the public key of the second SOCI and transfers the encrypted symmetric key and the encrypted contents of the original SOCI to the second SOCI via a server, which may be the IMS server. The second SOCI downloads the encrypted CSK. Once the encryption key is acquired by the new SOCI, the encrypted authentication data is downloaded from the server to the new SOCI to is decrypted utilizing the encryption key. The new SOCI is therefore able to access the same information as the original SOCI, and is said to host a cloned credential container.

Manual authorization of SOCI for performing digital signature[LBK10]

In one embodiment, a SOCI device includes a physical feature such as a button that allows a user to manually input his/her authorization of SOCI performing digital signature operations. The SOCI device will only perform digital signature operations when the button is pressed, thus preventing generation of digital signature without knowledge of the user, for example by a malicious program located on the SOCI's host machine. The user can press the authorization button when he/she is trying to authenticate him/herself.

In another embodiment, SOCI has a display that displays the message to inform the user what information SOCI is about to digitally sign upon user pressing the authorization button. This allows the user to know what he/she is authorizing. For example, a bank transaction will display "Transferring $10 to account #1234" on the SOCI display before the user can authorize the transaction by pressing the authorization button on the device.

External SOCI Control

In one embodiment of the invention, the user may utilize SOCI keyboard and display to digitally sign data without utilizing a computer. In order to digitally sign data, such as a text message, a user inputs the message into SOCI utilizing the keys of the keyboard. The user then verifies the accuracy of the entered message on the display and requests the digital signature of the entered message by pressing one of the keyboard buttons.

The user may also utilize SOCI to obtain his/her authentication information to be provided to an application that the user attempts to access without connecting SOCI to the user's computer. Upon receiving a prompt for authentication information, i.e. challenge phrase, at the user's computer, the user enters the request for the prompted information into the SOCI using SOCI keyboard. Upon retrieving the requested information, SOCI displays the data on its display, which then the user may manually enter at the user's computer.

Thus, a method and apparatus for user authentication have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A method for controlling access to a process to be executed on a data processing system, comprising:
   providing an interface for coupling a security device to the data processing system, wherein the security device is a separate hardware device from the data processing system;
   receiving user input of an identifier for accessing the security device;
   verifying the identifier;
   accessing the security device, in response to the identifier being verified, to obtain authentication data for the process to be executed on the data processing system;
   automatically capturing user authentication data input by a user into the data processing system;
   automatically converting the user authentication data into a stronger form of user authentication data to be presented to a process for accessing the process; and
   automatically storing the stronger form of user authentication data in the security device; and
   injecting the stronger form of authentication data into a login process associated with the process to be executed to automatically authenticate a user to the process to be executed, wherein the automatic capturing, converting and storing operations are performed by an access agent executing on the data processing system, and wherein the access agent is configured to periodically change the user authentication data for accessing a process automatically without the user being aware of the change.

2. The method of claim 1, wherein the security device stores authentication data for a plurality of processes, and wherein accessing the security device to obtain authentication data for the process to be executed comprises selecting authentication data for the process to be executed, from the stored authentication data for the plurality of processes, based on an identity of the process to be executed.

3. The method of claim 1, wherein the authentication data comprises a user identifier and a password associated with the process to be executed.

4. The method of claim 1, wherein:
   the security device stores a setup program that executes in response to coupling the security device to the data processing system,
   the setup program determines if an access agent is installed on the data processing system, and
   if an access agent is determined to not be installed on the data processing system, the setup program initiates an operation through which the data processing system retrieves the access agent from a remote computing device identified by the security device and installs the access agent on the data processing system.

5. The method of claim 1, wherein the identifier is verified by the data processing system communicating with a remote computing device that compares the identifier with an authentic identifier for accessing the security device.

6. The method of claim 1, wherein:
the receiving, verifying, and accessing operations are performed by an access agent executing as a background process on the data processing system,
the access agent monitors at least one of login, logout, or change of password activities performed by a user via user interfaces generated on the data processing system, and
the access agent records authentication data associated with the login, logout, or change of password activities in the security device as encrypted access scripts.

7. The method of claim 1, wherein:
the receiving, verifying, and accessing operations are performed by an access agent executing as a background process on the data processing system,
the access agent captures operating system messages for an application executing on the data processing system and identifies whether any operating system messages in the captured operating system messages comprise user authentication data,
the access agent stores the user authentication data in the security device in response to a captured operating system message being identified as having user authentication data, and
the access agent generates access scripts to be played back when a user subsequently attempts to access the application.

8. The method of claim 7, wherein the process to be executed is the application, and wherein injecting the authentication data into a login process associated with the process to be executed to automatically authenticate a user to the process to be executed further comprises:
in response to the user attempting to access the application, determining whether an access script exists for the application in the security device; and
playing back the access script to thereby inject the user authentication data into a login process of the application in response to determining that an access script exists for the application.

9. The method of claim 8, wherein, if an access script does not exist for the application, the access agent captures logon information entered by the user and stores the logon information as authentication data in the security device.

10. The method of claim 1, wherein automatically converting the user authentication data into a stronger form of user authentication data comprises at least one of automatically generating a longer password by adding alpha-numeric characters into a password of the user authentication data or generating a random password to be used instead of a password in the user authentication data.

11. The method of claim 1, wherein automatically converting the user authentication data into a stronger form of user authentication data is performed without the user being aware of the conversion.

12. The method of claim 1, wherein the security device stores a trusted host list identifying remote computing devices with which the identifier for accessing the security device may be verified, and wherein the verifying operation is limited to verifying the identifier with only remote computing devices identified in the trusted host list.

13. The method of claim 1, wherein the access agent compares the identifier with a previous valid identifier used to access a previous SOCI device, and wherein if the identifier is different from the previous identifier, the access agent encrypts the identifier with a public key of all SOCI devices used by a user associated with the SOCI device and distributes the encrypted identifier to all SOCI devices used by the user for storing in the SOCI devices.

14. The method of claim 1, wherein the security device uses private-public key authentication to authenticate the user to the process to be executed without the user being aware that private-public key authentication is being performed.

15. The method of claim 1, further comprising:
cloning the security device to generate a second security device, wherein cloning the security device comprises:
encrypting contents of a first security device with a symmetric key;
encrypting the symmetric key with a public key of a second security device; and
transferring the encrypted contents of the first security device and the encrypted symmetric key to the second security device.

16. The method of claim 1, wherein the security device comprises a physical feature for allowing a user to manually input the user's authentication for the security device to provide the authentication data, and wherein the security device only provides the authentication data in response to a physical interaction by the user with the physical feature of the security device.

17. The method of claim 1, wherein the security device comprises a display, and wherein the display presents information about the authentication data.

\* \* \* \* \*